United States Patent [19]
Cramaro

[11] Patent Number: 4,915,439
[45] Date of Patent: Apr. 10, 1990

[54] TARPAULIN SUPPORT STRUCTURE

[76] Inventor: Nello Cramaro, 779 York Road, Dundas, Ontario, Canada, L9J 1J9

[21] Appl. No.: 176,953

[22] Filed: Mar. 14, 1988

[30] Foreign Application Priority Data

Nov. 10, 1987 [CA] Canada ................................... 544414

[51] Int. Cl.⁴ .............................................. B60J 7/10
[52] U.S. Cl. .................................... 296/98; 296/118; 296/100
[58] Field of Search ................. 296/98, 100, 104, 118; 105/377

[56] References Cited

U.S. PATENT DOCUMENTS

| | | | |
|---|---|---|---|
| 1,358,978 | 11/1920 | Norton | 296/104 |
| 2,562,300 | 7/1951 | Dingman | 296/98 |
| 2,893,329 | 7/1959 | Janeczko | 105/377 |
| 2,955,874 | 10/1960 | Brindley | 296/104 |
| 3,226,153 | 12/1965 | Haid | 296/104 |
| 3,806,185 | 4/1974 | Brandjord | 296/98 |
| 4,302,043 | 11/1981 | Dimmer et al. | 296/98 |
| 4,302,044 | 11/1981 | Sims | 296/100 X |
| 4,335,915 | 6/1982 | Knapp | 296/100 X |

Primary Examiner—Margaret A. Focarino
Assistant Examiner—Gary C. Hoge
Attorney, Agent, or Firm—Rogers & Scott

[57] ABSTRACT

The invention provides a new support superstructure for tarpaulins employed to cover the open top of a load container, such as a transport truck. The superstructure comprises a plurality of transverse support members, usually convex-bowed upwards, that in an operative position extend fully across the container body, each being connected at one end to a vertical pivot rod pivotally mounted on one side of the body. The support member is moved to an inoperative stored position alongside one container wall by means of a handle at the lower end of the pivot rod and accessible to an operator standing on the ground. The two support members at the respective ends of the body can be fixed. Each pivot rod may be movable vertically to facilitate the movement of the support members over a heaped load. The handle also operates to latch the support member in the operative position, and also the inoperative position if required. The tarpaulin may have longitudinal transversely-spaced stiffening rods. The opposite side wall carries a ramp member that is engaged by the respective support member free end during its final movement into the operative position, in case the end sags too far downward, each ramp terminating in a stop member.

18 Claims, 4 Drawing Sheets

TARPAULIN SUPPORT STRUCTURE

FIELD OF THE INVENTION

The present invention is concerned with new flexible cover support superstructures, such as are required to support tarpaulins employed to close the open top of a load container, and especially with such superstructures employed on open-topped automotive transport bodies. For convenience in reference all such flexible covers will be referred to herein generally as tarpaulins.

REVIEW OF THE PRIOR ART

It has always been common in the transport industry to provide tarpaulins to close the open top of the typical top-loading body to protect the load against wind and weather, and to prevent its escape from the body. The typical transport body is about 2.5 meters (8 feet) wide and from 3 to 15 meters (10 to 48 feet) long, and this is usually too great a span for the tarpaulin without the provision of some rigid support that will hold it above the load and enable it to be held taut, so that it will not flap and strain while the transport is travelling at speed. Tarpaulins may be classified broadly into three separate types, two of which are more-or-less permanently installed on the load container, while the third is stored elsewhere and mounted on the container as and when required.

The official requirements for the carriage of various loads, particularly on public highways, have become more and more stringent, requiring adequate coverage for the load on even a short journey that previously would have been undertaken without a tarpaulin because of the time taken to put it in place for travel, and subsequently to remove it for re-loading. There has therefore been an industry-wide move to provide permanently installed tarpaulins that can relatively quickly be rolled and unrolled over the load by the driver. One permanently installed type is "end-rolled", the tarpaulin being gathered at one end (usually the front end) of the container and moved along the body between operative and stored positions. The tarpaulin is provided along its length with a number of transverse supporting bows which extend between the two longer side walls, and in the stored position are gathered with the tarpaulin at the front end, the bows usually being moved by means of a pair of cables trained over pulleys and carrying the tarpaulin with them as they move. With such an arrangement the movement of the tarpaulin automatically moves the bows out of the way so that they do not obstruct the reloading through the top opening and will not be damaged by the new load. An example of such a tarpaulin support and moving system is described in my prior U.S. Pat. No. 4,189,178 and Canadian Patent No. 995,714.

Some hauliers prefer to use a "side-rolled" tarpaulin which permanently extends the full length of the container body and is rolled and unrolled about a roll rod that also extends the full length of the container body. If the tarpaulin is only used occasionally it may be stored on the vehicle in folded condition and unfolded over the body as and when required. Both of the latter types of tarpaulins still usually require a support superstructure between the tarpaulin and the open top of the container if the tarpaulin is to be properly installed and handled easily without damage, and the superstructure must be capable of ready movement between its operative position across the body and a stored position in which it does not obstruct the body opening. An example of such a superstructure is disclosed in U.S. Pat. No. 2,955,874 and comprises a plurality of longitudinally spaced bows which can be separated at about their centres and the separate parts pivoted to lie alongside their respective sides; such an arrangement requires the operator to stand in the container or to climb upon the load to connect and disconnect the separate parts and this is clearly undesirable, as well as time consuming. U.S. Pat. No. 3,785,694 shows another arrangement employing a plurality of bows which have their ends inserted in sockets, from which they must be removed during re-loading.

DEFINITION OF THE INVENTION

It is therefore an object of the present invention to provide a new tarpaulin superstructure for use with tarpaulins of the side-rolled and occasionally installed types.

It is more specific object to provide a new tarpaulin superstructure for such tarpaulins that can be moved between operative and stored positions by an operator standing on the ground at the side of the container.

In accordance with the present invention there is provided a tarpaulin support superstructure for use with an open-topped container body constituted by two transversely spaced side walls, two longitudinally spaced end walls and a floor, the superstructure comprising:
- a plurality of longitudinally-spaced transverse support members of length to extend from one side of the container to the other, each with their two ends supported at the respective side walls, and each movable between an operative position in which the member extends between the side walls to support a tarpaulin thereon, and a stored position in which it lies along the respective side wall clear of the container body opening;
- a vertical pivot member for each transverse support member having the respective adjacent end of the support member attached to the upper end thereof, and mounted on a respective side wall for rotation about a vertical pivot axis, so that rotation of the pivot member about the said axis moves the support member between the said operative and stored positions; and
- a handle connected to each vertical pivot member for rotation of the pivot member about the pivot axis and consequent movement of the respective support members.

Each transverse support member may have a respective upwardly extending ramp for vertical longitudinal movement along its pivot axis to permit the displacable end of the support member to be elevated to clear the load in its movement from the stored to the operative position.

Each support member may also be mounted for vertical longitudinal movement along its pivot axis to permit the displacable end of the support member to be elevated to clear the load in its movement from the stored to the operative position.

Each vertical pivot member may be supported for its rotation on the container side wall by bearing means at the respective side of the container body, and a handle is connected to each vertical pivot member for rotation thereof about the pivot axis and consequent rotation of the respective support member, the handle being at the lower end of the pivot member for ready access by a human operator standing on the ground beside the container body.

DESCRIPTION OF THE DRAWINGS

Storable tarpaulin support superstructures which are particular preferred embodiments of the invention will now be described, by way of example, with reference to the accompanying diagrammatic drawings, wherein.

DESCRIPTION OF THE PREFERRED EMBODIMENTS

Figure 1:
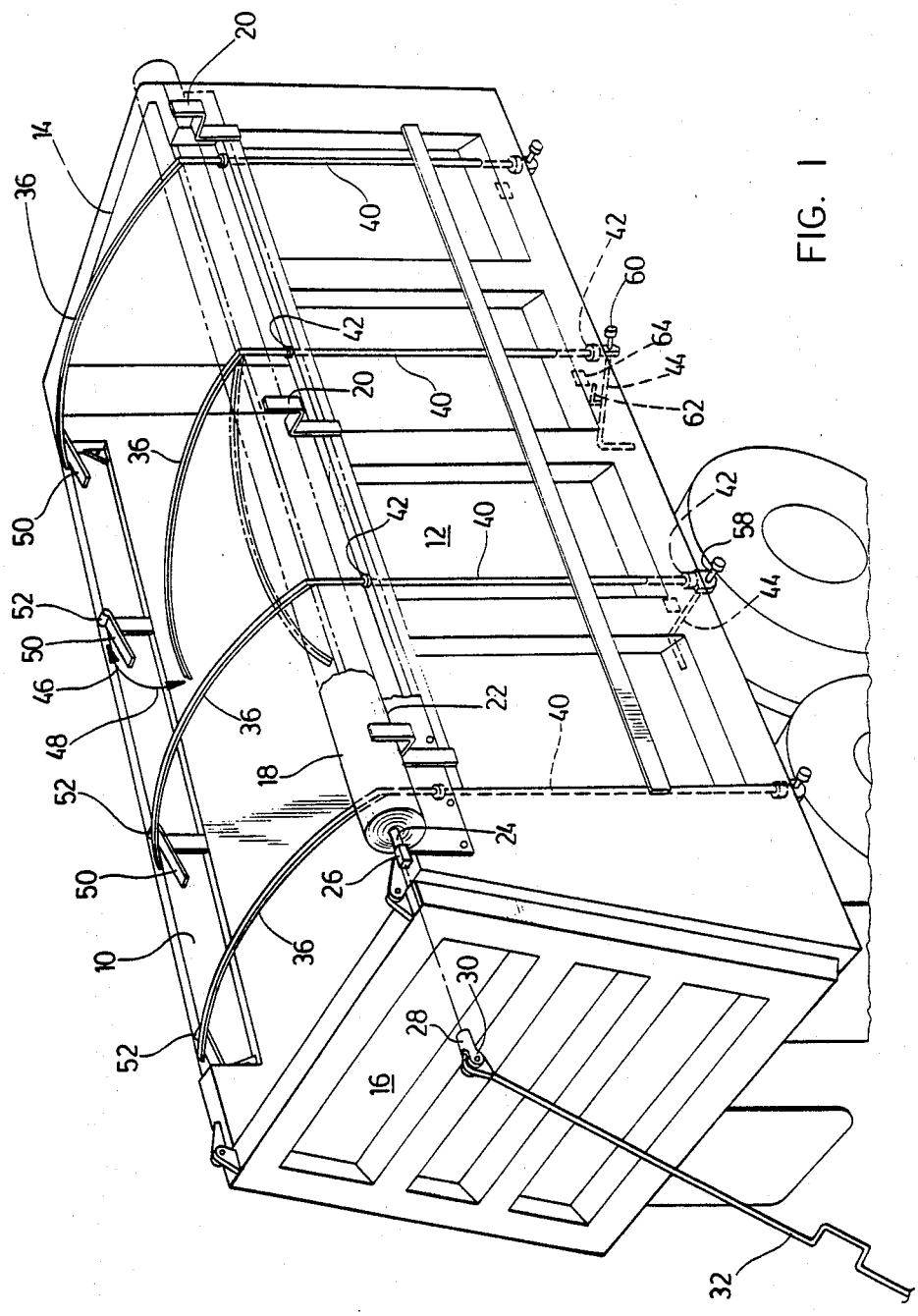
FIG. 1 is a perspective view to one side of an open-top truck body showing a side-rolled tarpaulin in rolled condition ready for unrolling onto a support superstructure that is a first embodiment of the invention, parts being shown broken away as required for greater clarity of illustration.
Figure 2:
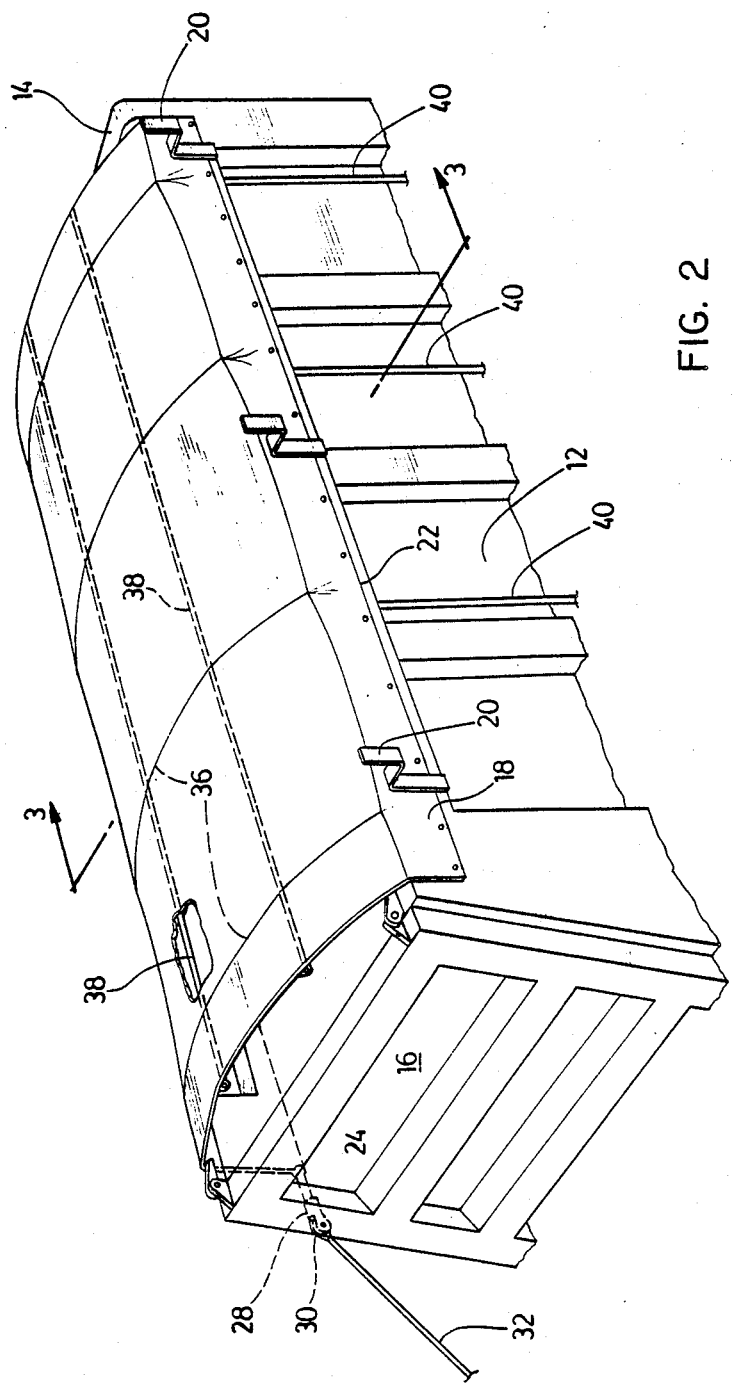
FIG. 2 is a view similar to FIG. 1 showing the tarpaulin in unrolled condition over the superstructure.
Figure 3:
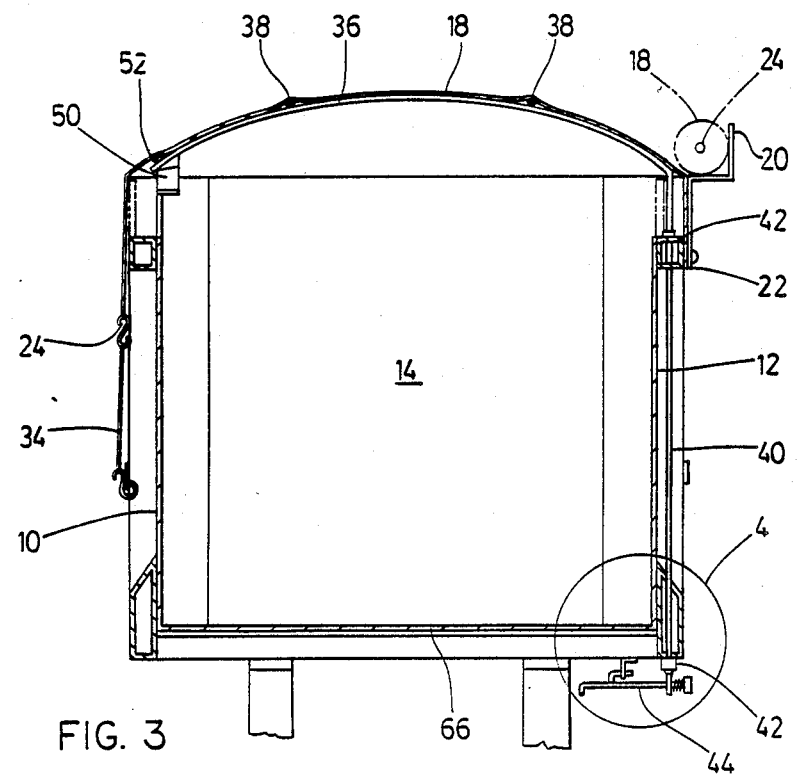
FIG. 3 is a transverse cross-section through the truck body taken on the line 3—3 of FIG. 2.

The invention is illustrated with both embodiments as applied to an open-topped rearwardly-tiltable road transport body having two transversely-spaced parallel longer side walls 10 and 12, and two longitudinally-spaced end walls constituted by a forward end wall 14 and a hinged rear door 16, the door being allowed to open to discharge the container load as the body is tilted by any of the usual mechanisms common in the industry. In this embodiment the open top is closed to cover the load as required by means of a permanently-installed, side-rolled tarpaulin 18 shown in the rolled, stored condition in FIG. 1, in which it rests in a plurality of longitudinally spaced L-shaped supports 20 fastened, as by welding or bolting, adjacent to the upper outer edge of the wall 12. The lower edge 22 of the tarpaulin is fastened at spaced intervals to the side 12 and it is rolled up, in known manner, about an elongated longitudinally-extending roll rod 24, the ends of which are provided with a rectangular male winder member 26 adapted to be engaged when required by a cooperating female winder member 28 connected by a universal joint 30 to the upper end of an elongated winding handle 32, by which the operator can roll and unroll the tarpaulin while standing on the ground alongside the container. With the tarpaulin fully unrolled, as shown in FIGS. 2 and 3, tensioning fastening means are attached to the free edge of the tarpaulin, shown in FIG. 4 as elastic hooked cords 34, but which may also comprise straps with over-centre fastening buckles, whatever is required to hold the tarpaulin taut and in snug contact with the supporting superstructure of the invention.

The superstructure comprises a plurality, four in this embodiment, of longitudinally-spaced, transversely-extending transverse support members 36, each of which is of sufficient length to extend across the full width of the body from the wall 12 to the wall 10, so that its two ends are supported at the tops of the respective walls. The transverse members are each convex upwardly so that the container body can be fully loaded with a heaped load without the load contacting the underside of the tarpaulin, and so that the tarpaulin can be held tightly in contact with them by the tensioning means 34 and not flap while the vehicle is travelling at speed. In order to reduce the number of transverse support members that are required the tarpaulin has sewn into it a member of transversely-spaced longitudinally-extending stiffening rods 38 which, when the tarpaulin is unrolled, rest on and bridge the spaces between the successive support members. In this embodiment two such stiffening rods are provided.

Each transverse support member is fastened at one end to a vertical pivot member 40, which is mounted by two vertically spaced bearings 42 fastened to the body wall 12, one adjacent the top and one adjacent the bottom, so that the member is capable of movement about a respective vertical longitudinal axis. Each pivot member carries at its lower end an outwardly transversely-extending handle 44, by which an operator standing on the ground beside the truck can rotate the respective transverse support member from the operative supporting position shown to a stored inoperative position in which it lies parallel to the body wall 12, illustrated in FIG. 1 by the member 36 shown in broken lines, leaving the top body opening completely clear for the charging of a new load without damage to the support structure. This rotation action is illustrated in FIG. 1 by one of the support members 36 being shown in an intermediate position, from which it is moved in the direction of the arrow 46 to the operative position, and in the direction of the arrow 48 to the stored inoperative position.

Figure 4:
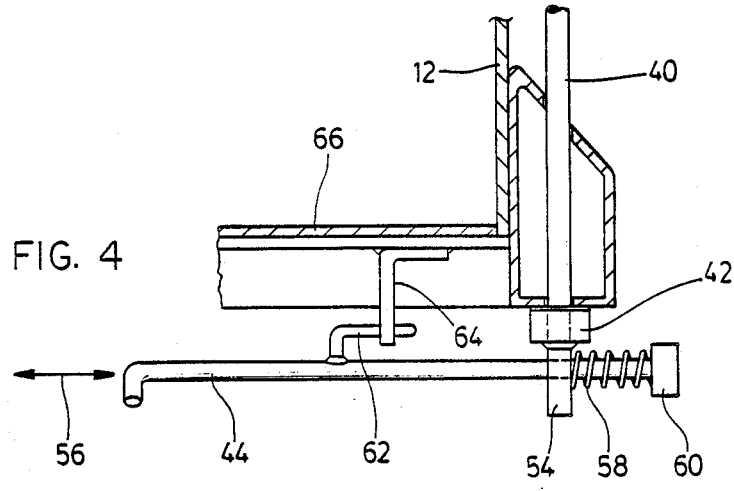
FIG. 4 is a cross-section to a larger scale of the part of FIG. 3 enclosed in the circle 4.

Unless each support member 36 is made thicker than is really necessary to perform its tarpaulin support function the free end not connected to the pivot member 40 will sag downward somewhat as it disengages from the top edge of the wall 10, and will be sagging in this manner as it is moved back toward its operative position. It may also be found that in use one or more of the support members is bent downwards somewhat by an inadvertent blow, and/or contact with the downwardly-falling load as the container is charged. The jamming of such a downwardly-sagging end against the inside surface of the wall 10 is prevented by a respective upwardly-inclined ramp member 50, which is engaged by the free support end during its last few degrees of rotation into the operative position, so that the end is lifted upwards until it engages a stop member 52 at the end of the ramp, which also positions the support member accurately in its required transverse orientation across the body opening. The transverse support member is not latched in this position by means of the handle 44, which is mounted in a boss 54 at the bottom end of the rod 40 for sliding movement in the direction of the arrows 56. The handle is urged permanently to the right as seen in FIG. 4 by a compression spring 58 interposed between the boss and a retainer 60; in its extreme right hand position a latch pin 62 is engaged in a latch aperture in a latch member 64 fastened to the truck body floor 66. If desired another latch member 64 can be provided that is engaged by the handle latch pin 62 when the support member 36 is in the inoperative stored position, so as to latch it in that position as well.

Although in the embodiment described all of the pivot members 40 are mounted on the same side wall 12, instead some can be mounted on one wall and some on the other, usually alternatively. However, in the case of a transport truck body it is usually preferred that they all be mounted on the same nearside wall, so that the driver will be shielded from the other traffic by the body if it is necessary to manipulate the superstructure while at roadside. It is also possible in other embodiments to connect all of the pivot rods 40 for simultaneous pivoting movement, although in the transport industry such a complication is not usually favoured and the simpler individually-operated system illustrated is preferred.

In the embodiment illustrated all of the support members are movable, but in other embodiments if the two members at the respective ends of the body are close enough to the ends, they can be fixed and not movable, since they do not normally obstruct the body opening.

Figure 5:
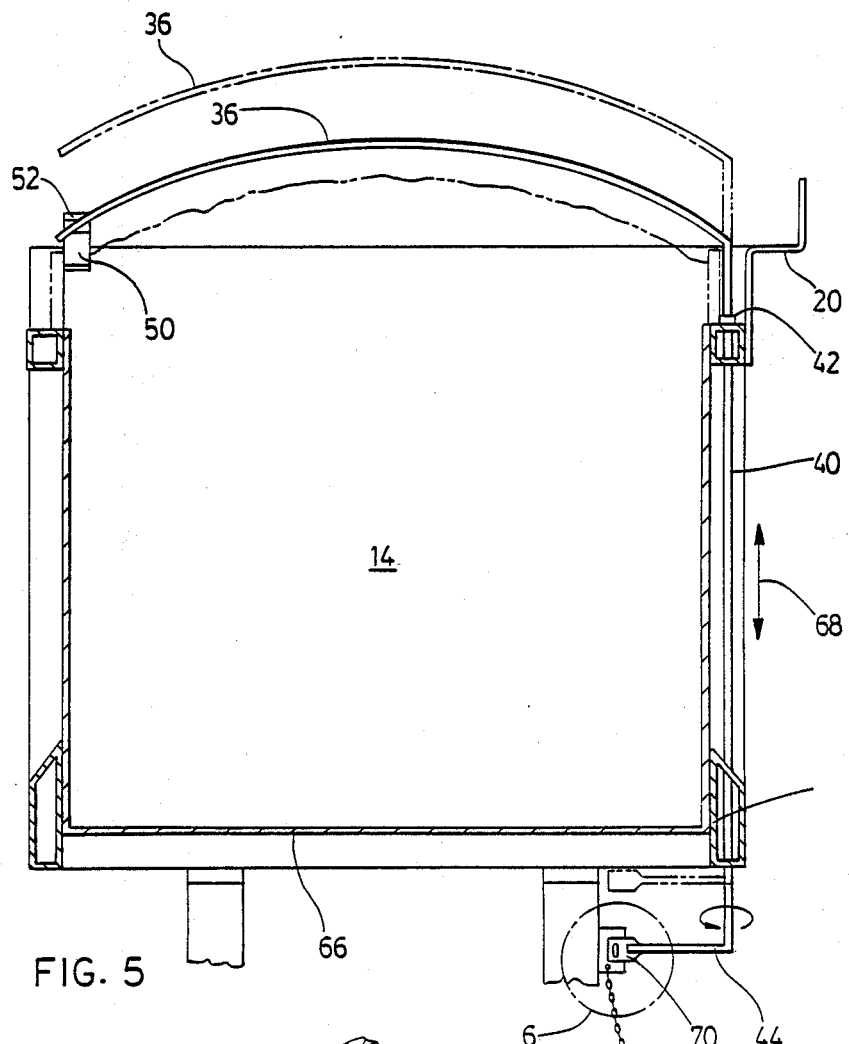
FIG. 5 is a transverse cross-section similar to FIG. 3 to illustrate a superstructure that is a second embodiment of the invention.
Figure 6:
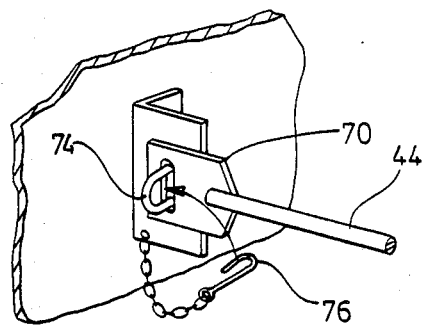
FIG. 6 is a cross-section to a larger scale of the part of FIG. 5 enclosed in the circle 6.

FIGS. 5 and 6 illustrate another embodiment of the invention in which the pivot rods 40 are capable of vertical longitudinal movement in the bearings 42, as indicated by the arrows 68, the rods extending below the vehicle floor 66 a sufficient distance to permit this movement. This facilitates the movement of the support members between stored and operative positions even if the load has been piled high in anticipation that it will settle somewhat as the truck moves. A different handle arrangement is also illustrated in which the handle 44 is fixed to the lower end of the vertically movable rod and has at its free end a securing hasp 70 that, with the support member in the operative position, is engaged over a loop 72 through which a fastening hook 74 is passed.

It will be seen that a simple yet highly effective tarpaulin support structure has been provided that is applicable to any size of truck and yet can be rendered operative and inoperative as required by an operator on the ground, who does not need to enter the truck body or climb upon the load for this purpose. The system can easily be incorporated into new container bodies, and can also easily be retro-fitted to existing container bodies, the exact bearing structure that is provided to pivot the vertical pivot members 40 depending upon the nature of the body structure on which it is to be mounted. Although the invention has been described applied to an opentopped truck transport body it will be apparent that it is also applicable to other open topped containers requiring such tarpaulin closure, such as railway trucks and stationary storage containers.

The embodiments of the invention in which an exclusive property or privilege is claimed are defined as follows:

1. A tarpaulin support superstructure for use with an open-topped container body constituted by two transversely spaced side walls, two longitudinally spaced end walls and a floor, the superstructure comprising:
    a plurality of longitudinally-spaced transverse support members each of a length to extend from one side of the container to the other with their two ends supported at the respective side walls, and each movable between an operative position in which the member extends between the side walls to support a tarpaulin thereon, and a stored position in which it lies along the respective side wall clear of the container body opening;
    a vertical pivot member for each transverse support member having an upper and a lower end and having a respective adjacent end of the support member attached to the upper end thereof, and mounted on a respective container side wall for rotation about a vertical pivot axis, so that rotation of the pivot member about the pivot axis moves the support member between the said operative and stored positions;
    an upwardly-extending ramp member for each transverse support member attached to the other side wall from the respective pivot member and engaged by the free end of the support member as it moves to the operative position to lift the free end and prevent jamming thereof against the other side wall; and
    a handle connected to each vertical pivot member for rotation fo the pivot member about the pivot axis and consequent rotation of the respective support member.

2. The invention as claimed in claim 1, wherein each support member is also mounted for vertical longitudinal movement along its pivot axis to permit the displaceable end of the support member to be elevated to clear the load in its movement from the stored to the operative position.

3. The invention as claimed in claim 1, wherein each ramp member terminates in a stop member which positions the respective support member in its operative position.

4. The invention as claimed in any one of claims 1, 2 or 3, wherein the handle comprises also a latch means for latching the respective support member in the operative position.

5. The invention as claimed in any one of claims 1, 2 or 3, wherein the handle comprises also a latch means for latching the respective support member in the operative position, and wherein each handle member is mounted for spring-urged longitudinal movement and carries a latch member which is engagable under urge of the spring when the respective support member is in the operative position with a cooperating latch member mounted on the body to retain the pivot member in the latched position, and thereby latch the respective support member in the operative position.

6. The invention as claimed in any one of claims 1, 2 or 3, wherein the handle comprises also a latch means for latching the respective support member in the operative position, and wherein each handle member is mounted for spring-urged longitudinal movement and carries a latch member which is engagable under urge of the spring when the respective support member is in the operative position with a cooperating latch member mounted on the body to retain the pivot member in the latched position, and thereby latch the respective support member in the operative position, and wherein the handle latch member is also engagable with another latch member on the body to latch the support member in the stored inoperative position.

7. The invention as claimed in any one of claims 1, 2 or 3, wherein the tarpaulin is provided with at least one transversely-spaced, longitudinally-extending stiffening rod which when the tarpaulin is unrolled on the support structure bridges the support members to support the tarpaulin between them.

8. The invention as claimed in any one of claims 1, 2 or 3, wherein each vertical pivot member is supported by an upper bearing adjacent the upper edge of the body and a lower bearing adjacent the lower edge of the body, and the handle is below the lower bearing for ready access by a human operator standing on the ground beside the container body.

9. The invention as claimed in any one of claims 1, 2 or 3, wherein each support member is covex upwardly to hold the tarpaulin clear of the load.

10. The invention as claimed in claim 2, wherein each ramp member terminates in a stop member which positions the respective support member in its operative position.

11. A tarpaulin support superstructure for use with an open-topped container body constituted by two transversely spaced side walls, two longitudinally spaced end walls and a floor, the superstructure comprising:

a plurality of longitudinally-spaced transverse support members each of a length to extend from one side of the container to the other with their two ends supported at the respective side walls, and each movable between an operative position in which the member extends between the side walls to support a tarpaulin thereon, and a stored position in which it lies along the respective side wall clear of the container body opening;

a vertical pivot member for each transverse support member having an upper and a lower end and having a respective adjacent end of the support member attached to the upper end thereof, and mounted on a respective container side wall for rotation about a vertical pivot axis, so that rotation of the pivot member about the pivot axis moves the support member between the said operative and stored positions; and a handle connected to each vertical pivot member for rotation of the pivot member about the pivot axis and consequent rotation of the respective support member;

wherein the handle comprises also a latch means for latching the respective support member in the operative position, each handle being mounted for spring-urged movement and carrying a latch member which is engagable under urge of the spring when the respective support member is in the operative position with a cooperating latch member mounted on the body to retain the pivot member in the latched position, and thereby latch the respective support member in the operative position.

12. The invention as claimed in claim 11, wherein the handle latch member is also engagable with another latch member on the body to latch the support member in the stored inoperative position.

13. A tarpaulin support superstructure for use with an open-topped container body constituted by two transversely spaced side walls, two longitudinally spaced end walls and a floor, the superstructure comprising:

a plurality of longitudinally-spaced transverse support members each of a length to extend from one side of the container to the other with their two ends supported at the respective side walls, and each movable between an operative position in which the member extends between the side walls to support a tarpaulin thereon, and a stored position in which it lies along the respective side wall clear of the container body opening;

a vertical pivot member for each transverse support member having an upper and a lower end and having a respective adjacent end of the support member attached to the upper end thereof, and mounted on a respective container side wall for rotation about a vertical pivot axis, so that rotation of the pivot member about the pivot axis moves the support member between the said operative and stored positions;

wherein each vertical pivot member is supported for said rotation on the container side wall by bearing means at the respective side of the container body; and a handle connected to each vertical pivot member for rotation of the pivot member about the pivot axis and consequent rotation of the respective support member, the handle being at the lower end of the pivot member for ready access by a human operator standing on the ground beside the container body;

wherein the handle comprises also a latch means for latching the respective support member in the operative position, each handle member being mounted for movement and carrying a handle latch member which is engagable when the respective support member is in the operative position with a cooperating body latch member mounted on the container body to retain the pivot member in the latched position and thereby latch the respective support member in the operative position.

14. The invention as claimed in claim 13, wherein each support member is also mounted for vertical longitudinal movement along its pivot axis to permit the displaceable end of the support member to be elevated to clear the load in its movement from the stored to the operative position.

15. The invention as claimed in claim 13 or 14, wherein the handle latch member is also engagable with another body latch member on the container body to latch the support member in the stored inoperative position.

16. The invention as claimed in claim 13 or 14, wherein the tarpaulin is provided with at least one transversely-spaced, longitudinally-extending stiffening rod which when the tarpaulin is unrolled on the support structure bridges the support members to support the tarpaulin between them.

17. The invention as claimed in claim 13 or 14, wherein each support member is covex upwardly to hold the tarpaulin clear of the load.

18. The invention as claimed in claim 13 or 14, wherein the handle latch means includes a spring and the handle and body latch members are engagable under the urge of the spring.

* * * * *